(12) United States Patent
Matsuo et al.

(10) Patent No.: US 8,097,131 B2
(45) Date of Patent: Jan. 17, 2012

(54) ELECTROCHEMICAL MACHINING METHOD AND ELECTROCHEMICAL MACHINING DEVICE

(75) Inventors: Toshiyuki Matsuo, Kagamigahara (JP); Kazuhiko Yoshiwaki, Kagamigahara (JP); Yasuo Fujihara, Yokohama (JP); Masaaki Inoue, Yokohama (JP); Mitsutoshi Watanabe, Tokyo (JP)

(73) Assignees: APC Aerospecialty Inc., Tokyo (JP); IHI Corporation, Tokyo (JP)

( * ) Notice: Subject to any disclaimer, the term of this patent is extended or adjusted under 35 U.S.C. 154(b) by 1062 days.

(21) Appl. No.: 11/993,178

(22) PCT Filed: Jun. 23, 2006

(86) PCT No.: PCT/JP2006/312615
§ 371 (c)(1),
(2), (4) Date: Dec. 19, 2007

(87) PCT Pub. No.: WO2006/137525
PCT Pub. Date: Dec. 28, 2006

(65) Prior Publication Data
US 2010/0051476 A1     Mar. 4, 2010

(30) Foreign Application Priority Data

Jun. 24, 2005 (JP) ................................. 2005-185274

(51) Int. Cl.
*B23H 5/10* (2006.01)

(52) U.S. Cl. ............... 204/230.3; 204/230.2; 204/228.9; 204/229.9

(58) Field of Classification Search .................. None
See application file for complete search history.

(56) References Cited

U.S. PATENT DOCUMENTS

| 3,551,310 A | 12/1970 | Inoue |
| 4,256,555 A | 3/1981 | Wilson et al. |

FOREIGN PATENT DOCUMENTS

| JP | 49-36102 B1 | 9/1974 |
| JP | 49-37904 B1 | 10/1974 |
| JP | 50-16026 Y1 | 5/1975 |
| JP | 55-48539 A | 4/1980 |
| JP | 05-318230 A | 12/1993 |

*Primary Examiner* — Yelena G Gakh
(74) *Attorney, Agent, or Firm* — Sughrue Mion, PLLC

(57) ABSTRACT

A method and a device for electrochemically machining workpiece having blade end plates at the longitudinal both ends of a blade-shaped portion having aerofoil shape in cross section by extending and retracting divided electrodes. A part of the blade-shaped portion and one blade end plate continued therewith are electrochemically machined by advancing the main electrode in an acute angle direction relative to the longitudinal direction of the blade-shaped portion. At the same time or subsequently, the remaining part of the blade-shaped portion and the other blade end plate continued therewith are electrochemically machined by slidably advancing an auxiliary electrode along the slope of the main electrode forming an acute angle relative to the blade-shaped-portion-machining-surface. Thus, the number of the parts of an electrode unit can be reduced and the structure thereof can be simplified.

10 Claims, 8 Drawing Sheets

Home Position

ELECTROCHEMICAL MACHINING METHOD AND ELECTROCHEMICAL MACHINING DEVICE

TECHNICAL FIELD

The present invention relates to a method and device for electrochemically machining a stator blade of a turbine or the like. The present invention also relates to an electrode unit to be used with the electrochemical machining method and device.

BACKGROUND ART

A stator blade and a rotor blade used for being incorporated in a gas turbine have respectively such a structure that a blade end plate is provided at either one or both ends of the blade-shaped portion having an aerofoil shape in cross section, and is arranged to be generally orthogonal to the longitudinal direction of the blade-shaped portion. Since the stator blade and the rotor blade are made of a specified alloy with superior heat resistance, respectively, machining thereof at high accuracy is very difficult. Nevertheless, on the other hand, these blades must be machined at high accuracy. Because of such circumstances, the electrochemical machining method is finally employed for finishing a workpiece at high accuracy after the workpiece has been roughly machined to a predetermined finish-machining margin.

In the electrochemical machining method disclosed in Japanese Patent Laid-Open Publication (KOKAI) No. JP-A-05-318230, a machining electrode is divided into three parts along the longitudinal direction of a blade-shaped portion and the respective parts is mutually slidable on the slope of other parts so as to be extensible along the slope. This arrangement properly maintains a gap (machining gap) between a machined surface of a workpiece (stator blade) to be worked and the electrode by gradually extending the parts of the electrode during the electrochemical machining process. Here, the electrochemical machining is performed by flowing electrolytic solution into the machining gap while applying a voltage (normally, a direct current voltage) between the machined surface of the workpiece and the electrode. The electrolytic solution is a conductive liquid, and is generally comprised of salt water, a sodium nitrate ($NaNO_3$) solution, and a potassium nitrate ($KNO_3$) solution.

With the described method, in order to extend and contract the electrode in the longitudinal direction of the blade-shaped portion of the workpiece, the electrode is divided into three-parts, so that each of the three-parts may be slidable on the slope which is inclined to the machined surface of the blade-shaped portion. Namely, relatively varying a position of each part in advancing movement thereof allows each part of the electrode to be relatively moved along the slope.

As described above, since the method disclosed in Japanese Patent Laid-Open Publication (KOKAI) No. JP-A-05-318230 is to divide the electrode into the three-parts to thereby relatively move respective parts, at least two pairs of driving means for relatively moving each part of the electrode are needed. Accordingly, there occurs a problem such that the number of parts of the electrode is increased, which makes the structure complex. In addition, there is another problem such that the large number of the parts causes an increase in the size of the electrode, and therefore it is difficult to use the electrode for performing electrochemical machining of a small workpiece.

DISCLOSURE OF THE INVENTION

Problems to be Solved by the Invention

The present invention was made in view of this circumstances, and has its first object to provide an electrochemical machining method suitable for machining a small workpiece, in which when extending and contracting the electrode, the number of parts of the electrode can be reduced, thereby simplifying the structure of the electrode per se.

A second object of the present invention is to provide an electrochemical machining device for direct use in carrying out the method. A third object of the present invention is to provide an electrode unit (an electrode assembly) for direct use in carrying out the method.

Means for Solving the Problems

The first object of the present invention is achieved by an electrochemical machining method of a conductive workpiece including a blade-shaped portion and blade end plates, the blade-shaped portion having an aerofoil shape in cross section, the blade end plates being provided to a longitudinal both ends of the blade-shaped portion to be substantially orthogonal to the longitudinal direction of the blade-shaped portion, comprising the steps of: advancing a main electrode in an acute angle direction relatively to the longitudinal direction of the blade-shaped portion; electrochemically machining, by the main electrode, a part of the blade-shaped portion and one of the blade end plates disposed to be in continuation therewith; advancing an auxiliary electrode to be slid along a slope of the main electrode, the slope forming an acute angle relative to a machining surface of the main electrode for machining the blade-shaped portion; and electrochemically machining, by the auxiliary electrode, a remaining part of the blade-shaped portion and the other of the blade end plates disposed to be in continuation therewith.

The second object of the present invention is achieved by an electrical machining device for a conductive workpiece including a blade-shaped portion and blade end plates, the blade-shaped portion having an aerofoil shape in cross section, the blade end plates being provided to a longitudinal both ends of the blade-shaped portion to be substantially orthogonal to the longitudinal direction of the blade-shaped portion, comprising: a workpiece holding means for holding the workpiece; an electrode feeding mechanism having a spindle advancing and retreating to the blade-shaped portion; a main electrode fixedly mounted on the spindle to advance towards a corner defined between the blade-shaped portion and one of the blade end plates by a relative movement of the spindle and the workpiece, thereby electrochemically machining a part of the blade-shaped portion and the other of the blade end plates held in continuation therewith; an auxiliary electrode capable of sliding along a slope of the main electrode, the slope forming an acute angle relative to a machining surface of the main electrode for machining the blade-shaped portion, the auxiliary electrode electrochemically machining a remaining part of the blade-shaped portion and the other of the blade end plates, which is continued therewith; an auxiliary electrode driving means for slidably driving the auxiliary electrodes along the slope; an electrolyte supplying means for supplying electrolytic solution to a gap formed between the main and auxiliary electrodes and the workpiece; a power source for applying an electric voltage between the main and auxiliary electrodes and the workpiece; and a control means for controlling relative positions of the main electrode, the auxiliary electrode and the workpiece, thereby electrochemically machining the workpiece.

The third object of the present invention is achieved by an electrode unit to be used with the electrical machining device according to claim 6, comprising: a main electrode having a blade-shaped-portion-machining-surface facing a part of the blade-shaped portion and a blade-end-plate-machining-surface facing to one of the blade tip plates, which is continued with the blade-shaped portion, and a slope forming an acute angle relative to the blade-shaped-portion-machining-surface; an auxiliary electrode held slidably along the slope of the main electrode, the auxiliary electrode having a blade-shaped-portion-machining-surface facing a remaining part of the blade-shaped portion and a blade-end-plate-machining-surface facing the other of the blade end plates, which is continued with the blade-shaped portion; and an auxiliary electrode driving means for moving the auxiliary electrode along the slope.

EFFECT OF THE INVENTION

According to the electrochemical machining method of the present invention, one main electrode and one auxiliary electrode can mutually slide on the slope in a manner such that the main electrode is diagonally advanced in the longitudinal direction of the blade-shaped portion of the workpiece while permitting the auxiliary electrode to be slid along the slope of the main electrode, and thus a machining electrode can be integrally formed with two components, i.e., the main and auxiliary electrodes. Further, since only one auxiliary electrode is necessary, there is no required other than just a single auxiliary electrode driving means. Therefore, the number of component parts of the electrode can be reduced, thereby simplifying the structure of the electrode. Accordingly, a reduction in the size of the whole of the electrode unit can be accomplished. This enables the electrode unit to be suitably used for electrochemical machining of a small workpiece.

In addition, the electrochemical machining device and the electrode unit according to the present invention can be directly used for carrying out the electrochemical machining method according to the present invention.

EXPLANATION OF REFERENCE NUMERALS

Figure 1:
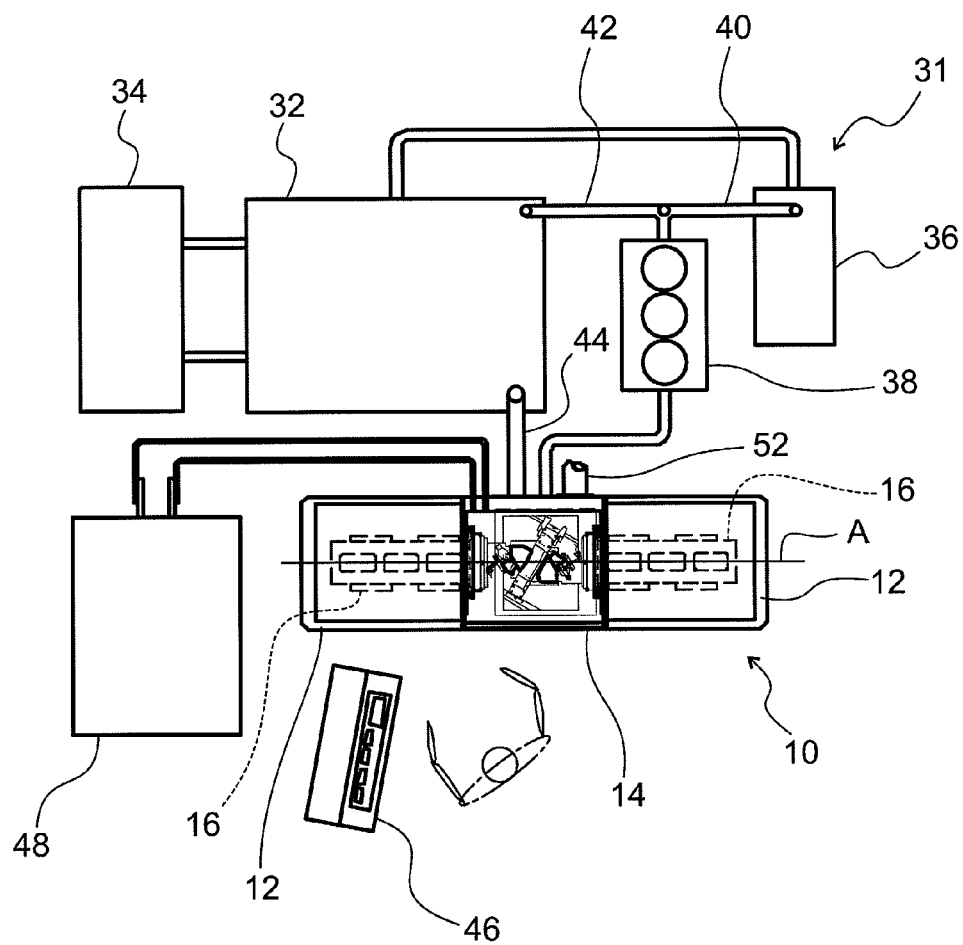
FIG. 1 is a plan view illustrating the general layout of an electrochemical machining device employing a 2-RAM machine according to an embodiment of the present invention.

10, 10A Electrochemical machining devices
16 Spindle (electrode feeding mechanism)
20, 20A Workpiece holding means
22 Stator blade (workpiece)
24 Blade-shaped portion
26, 28 Blade end plates
30, 30A Electrode units
31 Electrolyte supplying means
48 Power source
54, 54A Main electrodes
56, 56A Auxiliary electrodes
58, 70 Blade-shaped portion machining surfaces
60, 72 Blade end plate machining surfaces
64, 64A Slopes
66 Hydraulic cylinder (auxiliary electrode driving means)
A Spindle reciprocating direction
B Longitudinal direction of the blade-shaped portion
C Workpiece feeding direction (advancing/retreating movement direction)
θ1 Acute angle held with the longitudinal direction (B) of the blade-shaped portion and advancing direction of the main electrode
θ2 Acute angle held with the blade-shaped-portion-machining-surface of the main electrode and the slope of the main electrode on which the auxiliary electrode advances and retreats

BEST MODE FOR CARRYING OUT THE INVENTION

A main electrode is advanced prior to an auxiliary electrode, and the auxiliary electrode is advanced relatively faster than the main electrode when the main electrode reaches a predetermined advanced position. Then, both the blade-shaped-portion-machining-surfaces of the main electrode and the auxiliary electrode are brought to be in continuation with one another to form a flush machining surface when machining has been completed. Accordingly, the blade-shaped portion can be electrochemically machined smoothly. With the delayed advancing movement of the auxiliary electrode in the described manner, when the main electrode is advanced, an occurrence of any interference by the auxiliary electrode with the other of the blade end plates of the workpiece can be prevented.

In order to advance the main electrode in the direction relatively defining an acute angle to the longitudinal direction of the blade-shaped portion, the workpiece may be fixedly secured in a position where the longitudinal direction of the blade-shaped portion of the workpiece is inclined to the advancing direction (i.e., advancing and retreating direction, reciprocating direction) of the main electrode. In this case, the workpiece is fixedly secured in position, and only an electrode unit (electrode assembly containing the main electrode, the auxiliary electrode, and the auxiliary electrode driving means) may be advanced or retreated. Thus, a machining device is simplified. For instance, when the blade-shaped portion is simultaneously machined from both sides, i.e., front and rear surfaces, the 2-RAM machine provided with a pair of spindles (RAM) as electrode feeding mechanisms, which reciprocate on the same straight line with respect to the workpiece and mount thereon respective electrode units, can be used.

Furthermore, the workpiece may be moved along the longitudinal direction of the blade-shaped portion, and in synchronization with the movement of the workpiece the main electrode may be advanced or retreated in the direction orthogonal or generally orthogonal to the longitudinal direction of the blade-shaped portion. For instance, a 3-RAM machine can be employed when the blade-shaped portion is simultaneously machined from the two sides (i.e., from face and rear surfaces). In the 3-RAM machine, the electrode units (electrode assembly) are mounted on a pair of the spindles as an electrode feeding mechanism reciprocating on a common straight line; the workpiece is held by the other spindles operative as the workpiece holding section arranged to be orthogonal to the above-mentioned pair of spindles; and the workpiece and the electrode units are cooperated (synchronized) with one another to carry out advancing and retreating movements thereof. In this case, when advancing or retreating the workpiece and the electrode units (electrode assembly) while rotating the workpiece and the electrode unit, it is possible to three-dimensionally machine a complicated contour.

Incidentally, an auxiliary electrode driving means for sliding the auxiliary electrode can be formed by a double acting hydraulic cylinder.

Embodiment 1

Referring now to FIGS. 1 to 6, the description of the present invention will be provided hereinafter, by way of an electrochemical machining device employing a 2-RAM machine according to an embodiment of the present invention.

Figure 2:
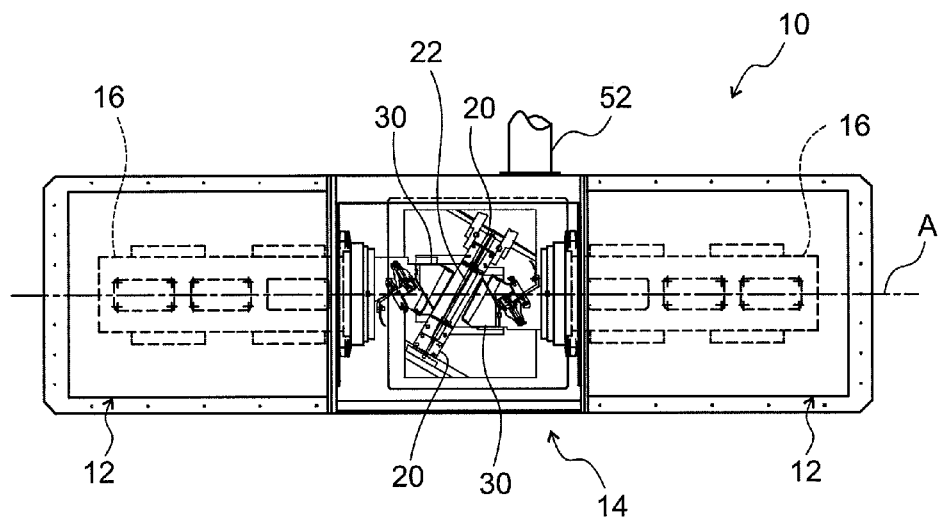
FIG. 2 is an enlarged plan view illustrating the 2-RAM machine employed by the embodiment in FIG. 1.
Figure 3:
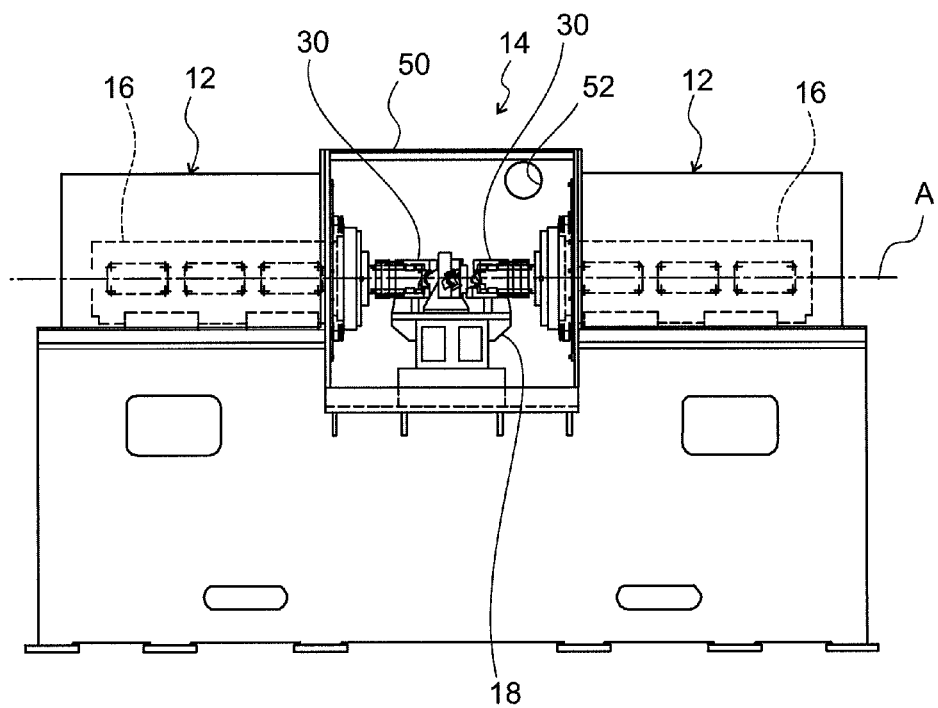
FIG. 3 is an enlarged front view illustrating the 2-RAM machine employed by the embodiment in FIG. 1.

In FIGS. 1 to 3, numeral 10 designates an electrochemical machining device having a pair of left and right driving sections 12, 12 and a machining section 14 at the center thereof. A pair of spindles (it will be also referred to as a RAM, hereinafter) 16, 16 capable of advancing or retreating on a common straight line A and of rotating are held on the driving section 12, 12, respectively. A pair of workpiece holding stands (holding means) 20, 20 are fixedly mounted on the floor surface of the machining section 14, i.e., on a worktable 18. The top ends of the spindles 16, 16 are arranged to extend toward a position above an intermediate of the workpiece holding means 20, 20. The spindles 16, 16 constitute an electrode feeding mechanism of the present invention.

Figure 4:
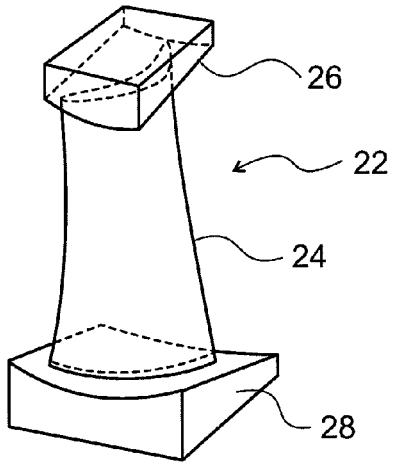
FIG. 4 is a perspective view illustrating a stator blade, which is one example of a workpiece to be machined.

A stator blade 22 for use in a turbine engine which is a workpiece, is fixedly mounted between the work holding means 20, 20. The stator blade 22 is formed integrally with a blade-shaped portion 24 and blade end plates 26, 28 thereof, as illustrated in FIG. 4. The stator blade 22 is made of a heat resistant alloy having electric conductivity, for example, AlTi and the like.

The stator blade 22 is fixedly mounted on the workpiece holding sections 20, 20 by using a jig so that the longitudinal direction of the blade-shaped portion 24 is placed in a generally horizontal state and further extends in a direction crossing a straight line A so as to define an acute angle θ1 with the straight line A. Electrode units 30, according to the present invention are held at extreme ends of the spindles 16, 16, respectively, and are advanced retreated along the straight line A which extends to diagonally cross the longitudinal direction B of the blade-shaped portion 24 when viewed in a plane as will be best illustrated in FIG. 5.

The explanation of an electrolyte supplying means 31 is provided hereinbelow. In FIG. 1, numeral 32 designates an electrolyte tank, numeral 34 a heater/cooler for regulating the temperature of an electrolytic solution by which the electrolytic solution within the electrolyte tank 32 is controlled at a constant temperature. Numeral 36 designates an electrolyte pump, and numeral 38 an electrolyte filter. The electrolyte pump 36 supplies the electrolytic solution from the electrolyte tank 32 to the machining section 14 via the electrolyte filter 38.

A liquid supplying pipe 40 feeds the electrolytic solution from the electrolyte pump 36 to the electrolyte filter 38. A branching pipe 42 is connected to the liquid supplying pipe 40 so that the liquid pressure of the electrolytic solution led to the electrolyte filter 38 is constantly maintained at a predetermined pressure. More specifically, the branching pipe 42 is connected to the electrolyte tank 32 via a relief valve (not shown) capable of opening at a predetermined pressure, and the relief valve opens to relieve the electrolytic solution when the discharge pressure of the electrolyte pump 36 increases to the predetermined pressure or greater.

The electrolytic solution fed to the machining section 14 is introduced into a gap or space between the stator blade 22 and the electrode units 30, 30, and the electrolytic solution passing through the gap is returned from a drain pipe 44 to the electrolyte tank 32. As described above, the electrolytic solution is circulated while being controlled in the temperature thereof. In FIG. 1, numeral 46 is an operation panel for a control means.

An electric voltage is applied between the stator blade 22 and the electrode unit 30. That is to say, a DC voltage is applied so that the stator blade 22 has an electric positive potential and the electrode 30 has an electric negative potential. The machining section 14 is closely covered by a cover 50 (FIG. 3) and the inside of the cover 50 is exhausted by an exhaust pipe 52.

Figure 5:
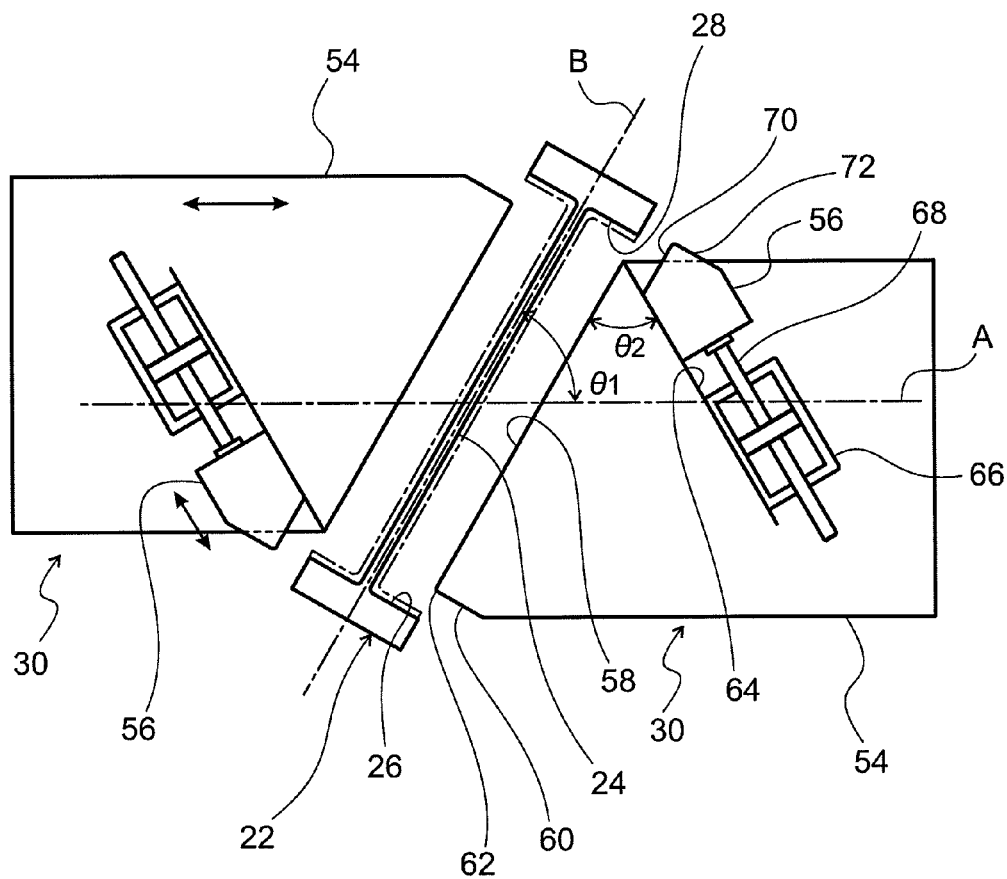
FIG. 5 is a plan view illustrating the position relationship between an electrode unit employed by the embodiment in FIG. 1 and the workpiece (a stator blade) to be machined.
Figure 6:
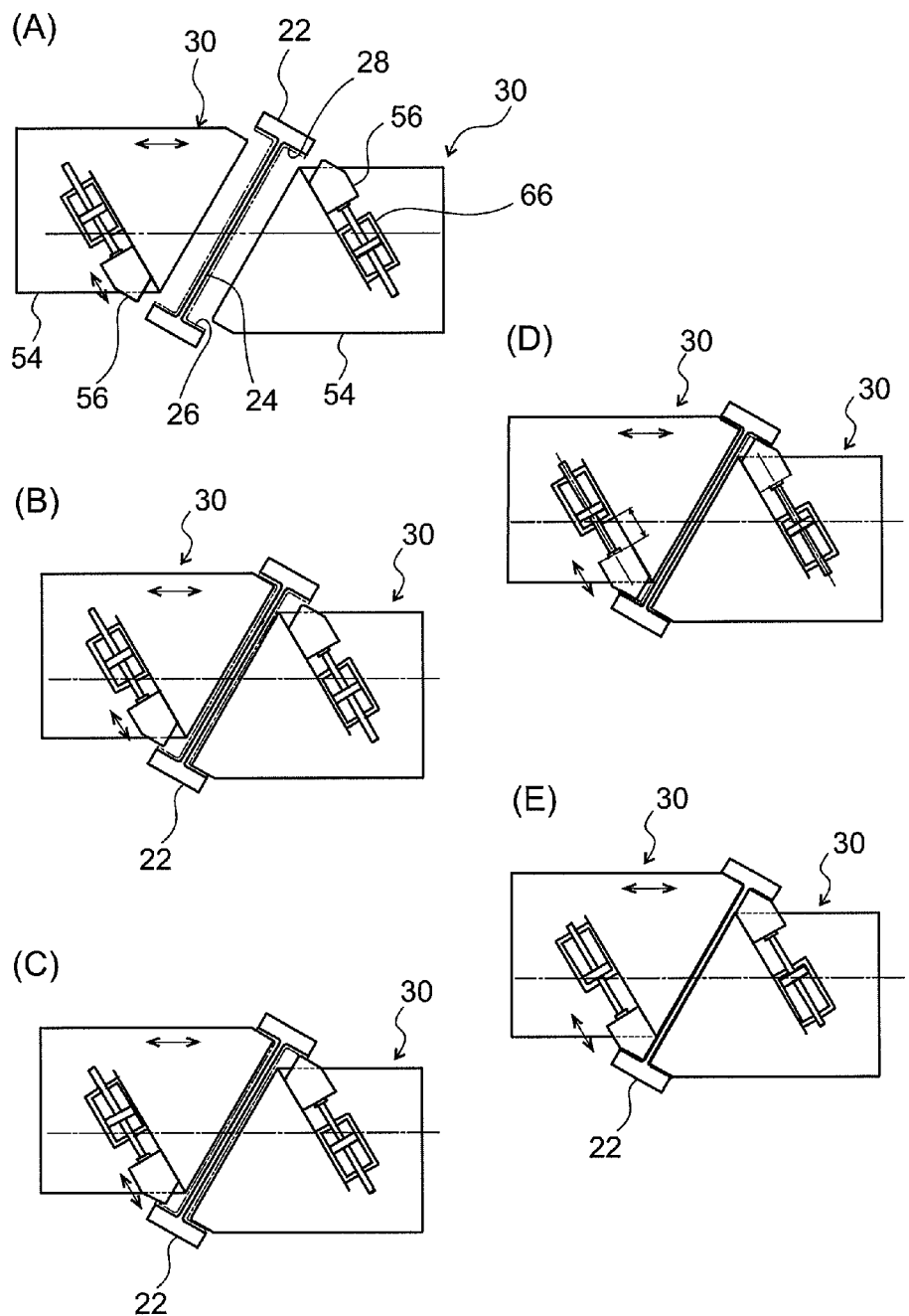
FIGS. 6(A) to 6(E) includes diagrammatic views, respectively, illustrating operation steps A to E carried out by the main electrode and the auxiliary electrodes in the electrode unit illustrated in FIG. 5.

The explanation of the electrode units 30, 30 is now provided hereinbelow. Both of a pair of electrode units 30, have an identical structure, respectively. The electrode unit 30 is provided with one main electrode 54 and one auxiliary electrode 56 as best illustrated in FIG. 5. The main electrode 54 is fixed to the spindle 16. The extreme end of the main electrode 54, i.e., the end facing the blade-shaped portion 24 of the stator blade 22, has the main machining surface 58 for machining the facing part of the blade-shaped portion 24 of the workpiece 22 and the machining surface 60 for machining the blade end plate 26 connected to the blade-shaped portion. The blade-shaped-portion-machining-surface 58 and the blade-end-plate-machining-surface 60 forms a generally right angle and the both machining surfaces 58, 62 share borders at an apex 62. The main electrode 54 is fixed to the spindle 16 so that the apex 62 is defined at the fore-end of the main electrode 54 and the blade-shaped-portion-machining-surface 58 is positioned to be inclined by an acute angle θ1 with respect to the longitudinal direction B of the blade-shaped portion 24.

The main electrode 54 has a slope 64 forming an acute angle θ2 with the blade-shaped-portion-machining-surface 58 at the side opposite to the blade-end-plate-machining-surface 60. The auxiliary electrode 56 is slidable along the slope 64. Namely, a double acting hydraulic cylinder 66 is mounted to the main electrode 54 to be parallel with the slope 64 and the auxiliary electrode 56 is connected to a piston rod 64 of the hydraulic cylinder 66 to be capable of reciprocating along the slope 64. The hydraulic cylinder 66 constitutes an auxiliary electrode driving means according to the present invention.

The tip end of the auxiliary electrode 56 is provided with an auxiliary machining surface 70 for machining the peripheral part of the blade portion 24 and a machining surface 72 for machining the blade end plate 26. The blade-shaped-portion-machining-surface 70 is disposed to be parallel with the blade-shaped-portion-machining-surface 58 of the main electrode 54. The blade-end-plate-machining-surface 72 is disposed to be orthogonal to the blade-shaped-portion-machining-surface 70. When the auxiliary electrode 56 moves forward to a given position (the position of (E) illustrated in FIG. 6) where the electrochemical machining operation is completed, the blade-shaped-portion-machining-surface 70 comes to a state where the blade-shaped-portion-machining-surface 70 is in smooth continuation with the blade-shaped-portion-machining-surface 58 of the main electrode 54 at that position shown in FIG. 6(E). The length summing the main and auxiliary machining surfaces 58, 70 is slightly shorter than that of the blade-shaped portion 24 of the workpiece 22, by the length of a gap or clearance required for applying electrochemical machining to the blade end plates 26, 28.

An operating fluid (an operating oil) controlled by an operation panel 46 (FIG. 1) is supplied into the cylinder 66, which advances or retreats the piston rod 68. Accordingly, the position of the auxiliary electrode 56 is controlled in the reciprocating direction.

The operation of the embodiment is now described hereinbelow. FIGS. 5 and 6(A) illustrate a state where the spindles 16, 16 are retreated to the initial position (home position). The electrode units 30, 30 are mounted on the spindles 16, 16 so that both units are disposed to be in point symmetry but in a reversed relationship with one another with respect to the workpiece 22 held between both electrode units 30, 30. The workpiece 22 is fixedly held by the opposing work holding means 20, 20 to be positioned so that the longitudinal direction B of the blade-shaped portion 24 is parallel to the respective blade-shaped-portion-machining-surfaces 58, 58. In this state, each auxiliary electrode 56 is maintained at a position retreated from the main electrode 54 (state shown in FIG. 6(A)).

Controlling by the operation panel 46, the pump 36 supplies the electrolytic solution to the machining portion of the workpiece 22, an electric voltage is applied between each of the electrode units 30, 30 and the workpiece 22, and the spindles 16, 16 are driven to move forward to the workpiece 22 (the state shown in FIG. 6(B)). Since the respective auxiliary electrodes 56 are retracted from the respective main electrode 54 at that time, the respective auxiliary electrodes 56 can be prevented from contacting the blade end plates 26, 28 of the workpiece 22. In this state, the blade-shaped-portion-machining-surface 58 and the blade-end-plate-machining-surface 60 of the main electrode 54 electrochemically machine a part of the blade-shaped portion 24 of the workpiece 22 and one blade end plate 26 or 28 continuing to the part of the blade-shaped portion, respectively.

Electrochemically machining of the part of the blade-shaped portion 24 and the blade end plate 26 or 28 proceeds by the operation of the blade-shaped-portion-machining-surface 58 and the blade-end-plate-machining-surface 60 of each of the main electrodes 54, and when the respective main electrodes 54 comes to a predetermined position thereof, the respective auxiliary electrodes 56 is pushed out by the hydraulic cylinder 66 toward their respective advancing directions, as illustrated in FIG. 6(C). At this time, the position (predetermined position) of each main electrode 54 corresponds to a position at which each auxiliary electrode 56 does not interfere with the other blade end plate 28 or 26 when the respective auxiliary electrodes 56 advances.

As the respective auxiliary electrodes 56 advances, the auxiliary blade-shaped-portion-machining-surface 70 of each auxiliary electrode 56 electrochemically machines the remaining peripheral part of the blade-shaped portion 24 (i.e., the remaining part of the blade-shaped portion not 24 machined by the main electrode 54) and also the blade-end-plate-machining-surface 72 machines the other blade end plate 28 or 26 (FIG. 6(D)). When each of the auxiliary electrodes 56 further advances to come to the position at which the auxiliary blade-shaped-portion-machining-surface 70 thereof and the main blade-shaped-portion-machining-surface 58 of the associated main electrode 54 are smoothly continued with each other to form a flush combined machining surface, the operation of the electrochemical machining is completed, as illustrated in FIG. 6(E).

The above-described explanation of the operations has stated that the main electrodes 54 and the auxiliary electrodes 56 operate individually, for the sake of clarity. However, since electrochemical machining by both of the electrodes 54 and 56 are performed in parallel with one another, forward movement of both of the electrodes 54, 56 is carried out in association with each other. Namely, the main electrodes 54 move forward earlier than the auxiliary electrodes 56 until coming to the predetermined position thereof, as illustrated in FIGS. 6(A) and 6(B), and both auxiliary electrodes 56 move forward relatively faster than the main electrodes 54 when passing past the predetermined position, as illustrated in FIGS. 6(C) and 6(D). At the position of completion of the electrochemical machining, the blade-shaped-portion-machining-surfaces 58, 70 of both electrodes 54 and 56 are brought to be in continuation with one another to form a flat surface, as illustrated in FIG. 6(E).

Embodiment 2

Figure 7:
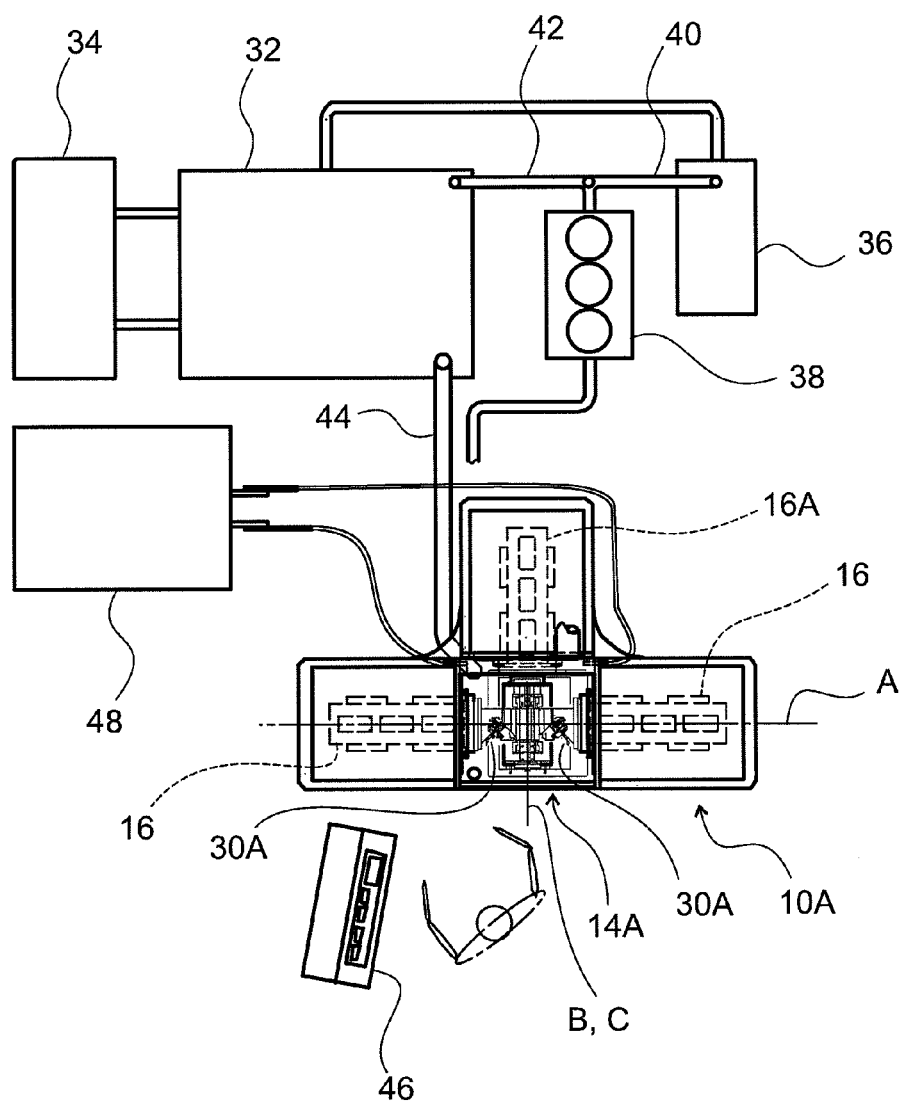
FIG. 7 is a plan view illustrating the general layout of an electrochemical machining device using a 3-RAM machine according to a second embodiment of the present invention.
Figure 8:
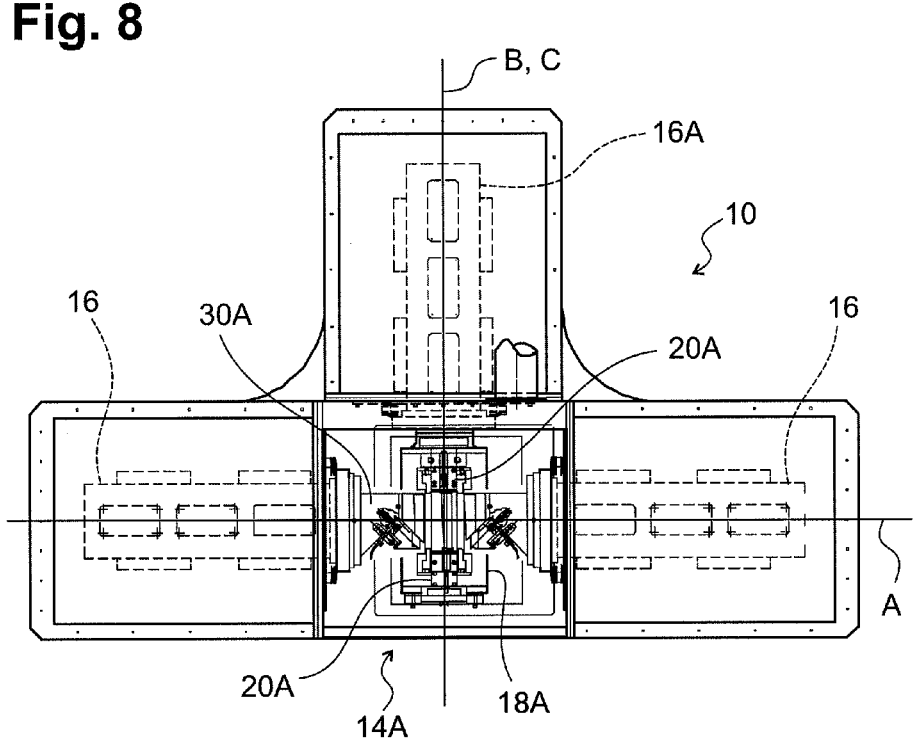
FIG. 8 is an enlarged plan view illustrating the 3-RAM machine employed by the second embodiment.
Figure 9:
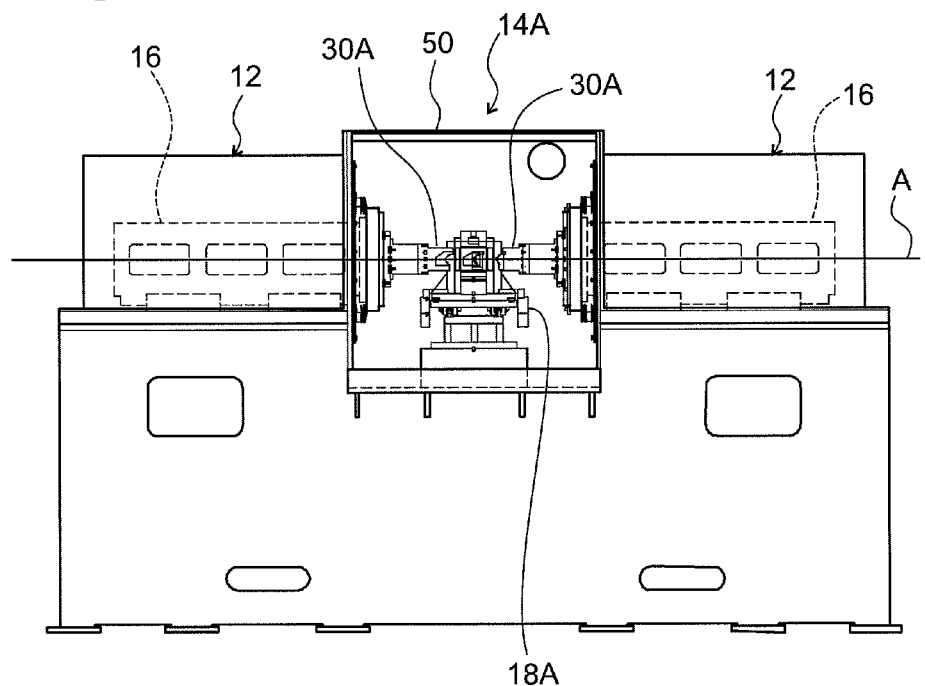
FIG. 9 is an enlarged front view illustrating the 3-RAM machine, which is employed by the second embodiment.
Figure 10:
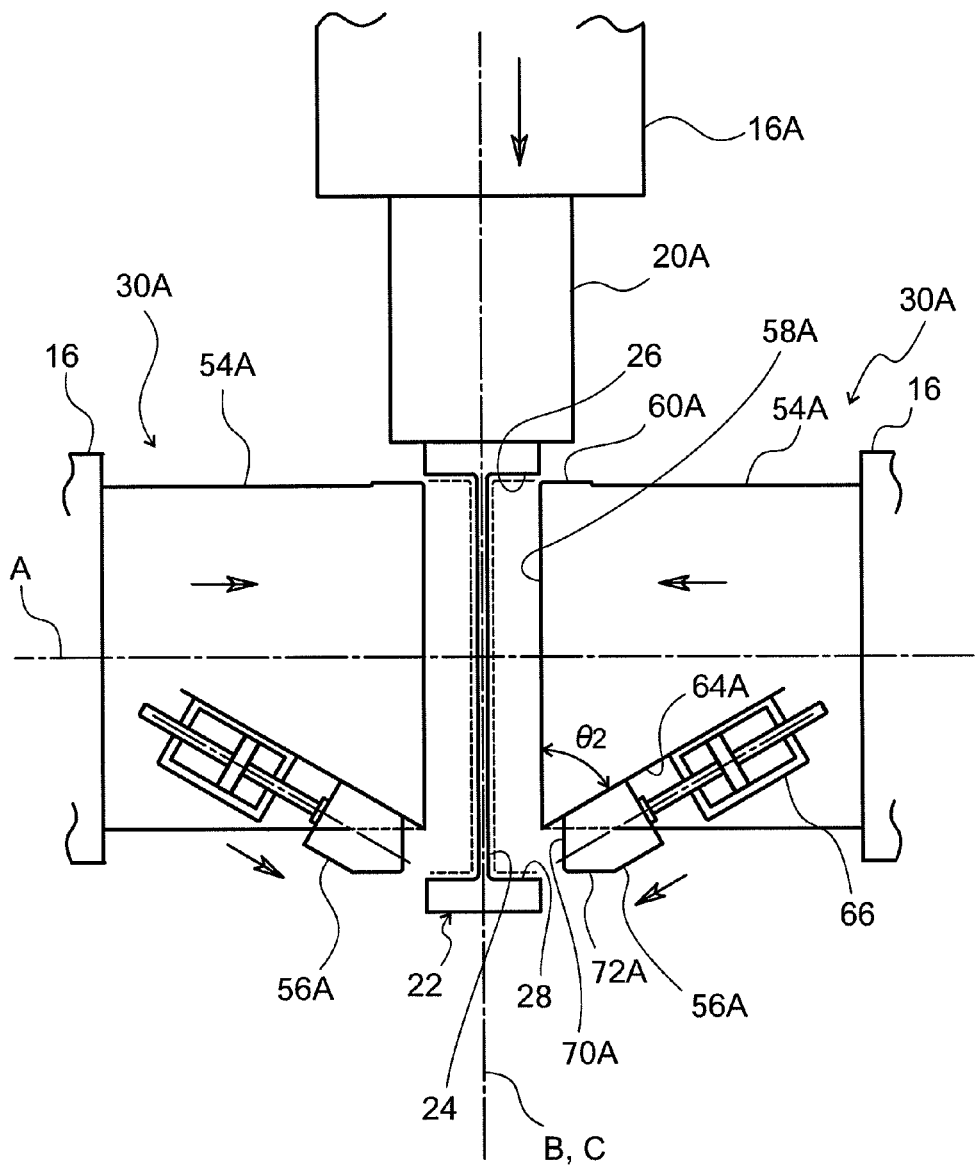
FIG. 10 is a plan view illustrating the position relationship among the electrode units, the workpiece (stator blade) to be machined, and a third spindle incorporated in the second embodiment.

FIG. 7 is a plan view illustrating the general layout of an electrochemical machining device using a 3-RAM machine according to the second embodiment of the present invention. FIG. 8 is an enlarged plan view illustrating the same 3-RAM machine, and FIG. 9 is an enlarged front view illustrating the same 3-RAM machine. FIG. 10 is a plan view illustrating the electrodes, and FIGS. 11(A) to 11(D) is diagrammatic views illustrating operation steps (A) to (D) of the electrodes. Since the same numeral references are given to the parts in FIGS. 7 to 11 corresponding to those in the embodiment illustrated in FIGS. 1 to 6 and, therefore the explanation of these parts are not repeated.

Figure 11:
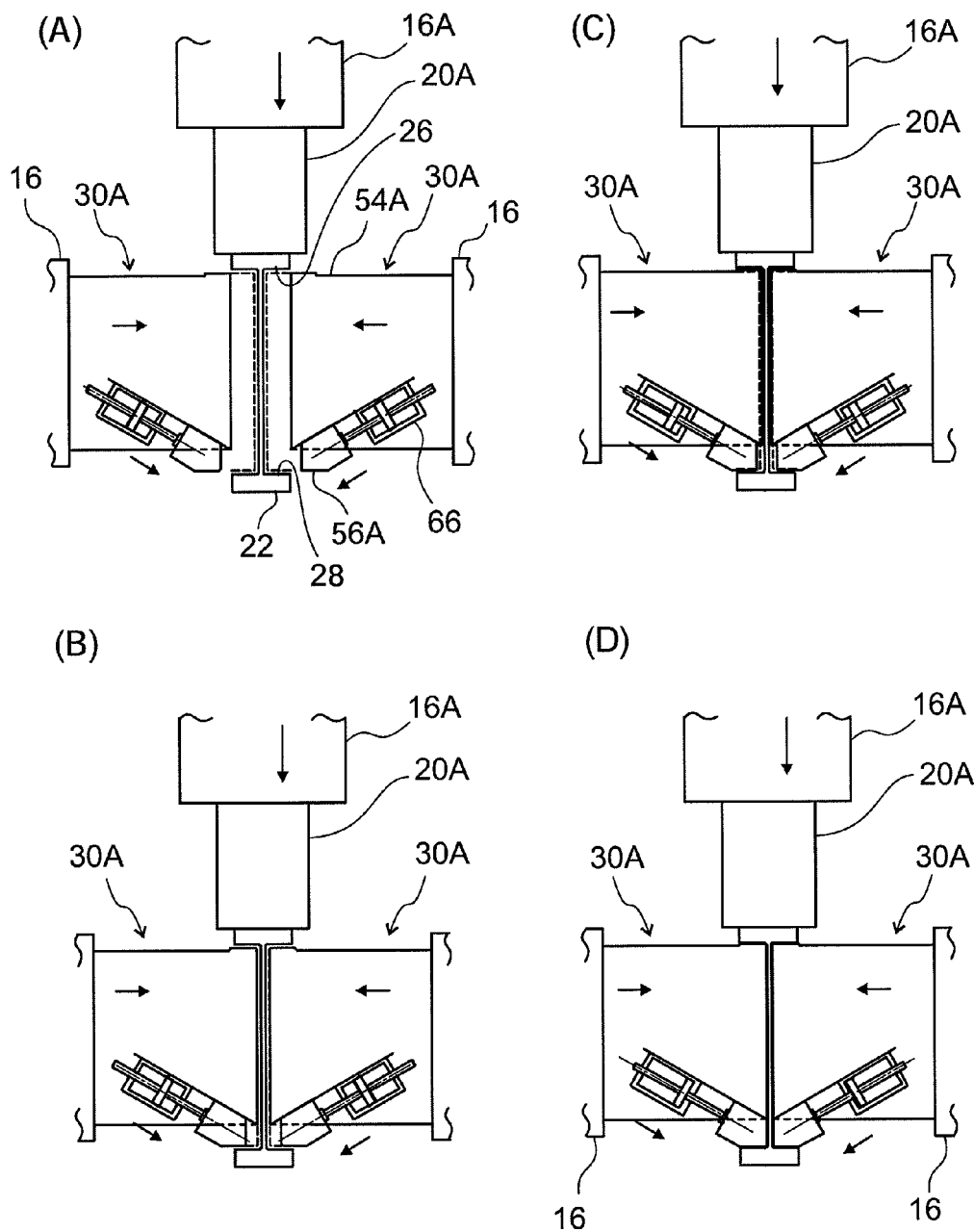
FIGS. 11(A) to 11(D) are diagrammatic views, respectively, illustrating operation steps A to D carried out by the main electrodes and the auxiliary electrodes of the electrode units illustrated in FIG. 10 and the third spindle.

The electrochemical machining device 10A used herein is provided with a pair of the spindles 16, 16 advancing and retreating on the straight line A and a third spindle 16A reciprocating on a straight line C orthogonal to the straight line A. The work table 18A of the machining section 14A is connected to the spindle 16A and is reciprocatable between the spindles 16, 16 along the direction of the straight line C. The workpiece 22 to be worked is fixedly mounted on the work table 18A in a state where the longitudinal direction B of the blade-shaped portion 24 is in alignment with the direction of the straight line C. Numerals 20A, 20A denote the workpiece holding means that fixedly secure the workpiece 22 to the work table 18A. In FIGS. 10 and 11, only one work piece holding means 20A is shown for the brevity sake.

The electrode units 30A, 30A have generally the same structures as those of the electrode units 30, 30 illustrated in FIGS. 1 to 6 and slightly different mounting angles to the spindles 16, 16. That is, since the longitudinal direction B of the blade-shaped portion 24 of the workpiece 22 is positioned on the straight line C orthogonal to the straight line A, the blade-shaped-portion-machining-surface 58A and the blade-end-plate-machining-surface 60A of each main electrode 54A are arranged to be in parallel to the straight line B (C) and the straight line A, respectively. Also, the blade-shaped-portion-machining-surface 70A and the blade-end-plate-machining-surface 72 of each auxiliary electrode 56A are arranged to be in parallel to the straight line B (C) and the straight line A, respectively.

The operations of this device is now explained hereinbelow. Each auxiliary electrode 56A is sufficiently set back from the associated main electrode 54A, and a pair of the electrode units 30A, 30A are held at their standby positions against the blade-shaped portion 24 of the workpiece 22, as illustrated in FIG. 11(A) and the home position in FIG. 10. At that time, the other blade end plate 26 of the workpiece 22 is separated a predetermined distance apart from the blade-end-plate-machining-surface 72A upward in FIGS. 10 and 11.

From the state mentioned above, both electrode units 30A, 30A are synchronized and are advanced toward the workpiece 22 to perform the electrochemical machining operation. Simultaneously, the spindle 16 A is gradually projected downward, as illustrated in FIGS. 10 and 11, so that the workpiece 22 is moved downward. Also, each hydraulic cylinder 66 moves the related auxiliary electrode 56A forward at a speed faster than that of the main electrode 54A on a slope 64A, as illustrated in FIG. 11(B), when the respective main electrodes 54A come to a predetermined position thereof.

In this manner, the electrode units 30A, 30A are advanced toward the workpiece 22 while moving the workpiece 22 on the straight line B(C) downward, as illustrated in FIG. 10. Thus, the electrode unit 30A, 30A are relatively moved in the vector direction combined with both velocity vectors to the workpiece 22. That is to say, each main electrode 54A advances in a direction that forms an acute angle with the longitudinal direction B of the blade-shaped portion 24, namely toward the corner formed with the blade-shaped portion 24 and the blade end plate 26. When the respective main electrodes 54A comes to the predetermined advancing position thereof, the respective auxiliary electrodes 56A moves forward faster and electrochemically machines the workpiece while advancement without interference with the other blade end plate 28 of the workpiece 22, as illustrated in FIG. 11(C).

When the operation of the electrochemical machining has been completed, the blade-shaped-portion-machining-surfaces 58A and 70A of the main electrodes 54A and the auxiliary electrodes 56A are brought to be in continuation with one another to form a flush machining surface, as illustrated in FIG. 11(D). The operations described above are continuously performed while accurately controlling the relative positions of the auxiliary electrodes 56A and the workpiece 22. Accordingly, the workpiece 22 can be accurately and precisely subjected to the finish work by the electrochemical machining.

The invention claimed is:

1. An electrochemical machining method of a conductive workpiece including a blade-shaped portion and blade end plates, the blade-shaped portion having an aerofoil shape in cross section, the blade end plates being provided to a longitudinal both ends of the blade-shaped portion to be substantially orthogonal to the longitudinal direction of the blade-shaped portion, comprising the steps of:

advancing a main electrode in an acute angle direction relatively to the longitudinal direction of the blade-shaped portion;

electrochemically machining, by the main electrode, a part of the blade-shaped portion and one of the blade end plates disposed to be in continuation therewith;

advancing an auxiliary electrode to be slid along a slope of the main electrode, the slop forming an acute angle relative to a machining surface of the main electrode for machining the blade-shaped portion; and electrochemically machining, by the auxiliary electrode, a remaining part of the blade-shaped portion and the other of the blade end plates disposed to be in continuation therewith.

2. The electrochemical machining method according to claim 1, wherein the main electrode is urged to advance prior to the auxiliary electrode, the auxiliary electrode is then started to advance relatively to the main electrode from a predetermined position in advancement of the main electrode, and upon completion of electrochemical machining operation the machining surfaces of the main electrode for machining the blade-shaped portion is continued with the auxiliary machining surface of the auxiliary electrode for machining the remaining lateral part of the blade-shaped portion so as to form a flush machining surface.

3. The electrochemical machining method according to claim 1, wherein the workpiece is fixedly mounted at a position where the longitudinal direction of the blade-shaped portion thereof is inclined to an advancing/retreating direction of the main electrode.

4. The electrochemical machining method according to claim 1, wherein the workpiece is moved in the longitudinal direction of the blade-shaped portion thereof while the main electrode is advanced or retreated in a direction orthogonal to said longitudinal direction of the blade-shaped portion of the workpiece.

5. The electrochemical machining method according to claim 1, wherein a pair of electrode units, each including the main electrode and the auxiliary electrode, are arranged substantially symmetrically with respect to the workpiece, and both sides of the blade-shaped portion are simultaneously electrochemically machined.

6. An electrical machining device for a conductive workpiece including a blade-shaped portion and blade end plates, the blade-shaped portion having an aerofoil shape in cross section, the blade end plates being provided to a longitudinal both ends of the blade-shaped portion to be substantially orthogonal to the longitudinal direction of the blade-shaped portion, comprising:

a workpiece holding means for holding the workpiece;

an electrode feeding mechanism having a spindle advancing and retreating to the blade-shaped portion;

a main electrode fixedly mounted on the spindle to advance towards a corner defined between the blade-shaped portion and one of the blade end plates by a relative movement of the spindle and the workpiece, thereby electrochemically machining a part of the blade-shaped portion and the other of the blade end plates held in continuation therewith;

an auxiliary electrode capable of sliding along a slope of the main electrode, the slope forming an acute angle relative to a machining surface of the main electrode for machining the blade-shaped portion, the auxiliary electrode electrochemically machining a remaining part of the blade-shaped portion and the other of the blade end plates, which is continued therewith;

an auxiliary electrode driving means for slidably driving the auxiliary electrodes along the slope;

an electrolyte supplying means for supplying electrolytic solution to a gap formed between the main and auxiliary electrodes and the workpiece;

a power source for applying an electric voltage between the main and auxiliary electrodes and the workpiece; and a control means for controlling relative positions of the main electrode, the auxiliary electrode and the workpiece, thereby electrochemically machining the workpiece.

7. The electrical machining device according to claim 6, wherein the workpiece holding means fixedly secures the workpiece at a position where the longitudinal direction of the blade-shaped portion is inclined to an advancing/retreating direction of the spindle of the electrode feeding mechanism.

8. The electrical machining device according to claim 6, wherein the workpiece holding means holds the workpiece to be capable of advancing and retreating in the longitudinal direction of the blade-shaped portion, and the spindle of the electrode feeding mechanism advances and retreats in a direction orthogonal to the longitudinal direction of the blade-shaped portion.

9. The electrical machining device according to claim 6, wherein the auxiliary electrode driving means is constituted by a double acting hydraulic cylinder.

10. An electrode unit to be used with the electrical machining device according to claim 6, comprising:

a main electrode having a blade-shaped-portion-machining-surface facing a part of the blade-shaped portion and a blade-end-plate-machining-surface facing to one of the blade tip plates, which is continued with the blade-shaped portion, and a slope forming an acute angle relative to the blade-shaped-portion-machining-surface;

an auxiliary electrode held slidably along the slope of the main electrode, the auxiliary electrode having a blade-shaped-portion-machining-surface facing a remaining part of the blade-shaped portion and a blade-end-plate-machining-surface facing the other of the blade end plates, which is continued with the blade-shaped portion; and an auxiliary electrode driving means for moving the auxiliary electrode along the slope.

\* \* \* \* \*